United States Patent [19]
Wilkinson

[11] 3,742,506

[45] June 26, 1973

[54] DUAL FREQUENCY DUAL POLARIZED ANTENNA FEED WITH ARBITRARY ALIGNMENT OF TRANSMIT AND RECEIVE POLARIZATION

[75] Inventor: Ernest James Wilkinson, Sudbury, Mass.

[73] Assignee: Communications Satellite Corporation, Washington, D.C.

[22] Filed: Mar. 1, 1971

[21] Appl. No.: 119,768

[52] U.S. Cl. ........... 343/176, 343/100 PE, 343/854, 343/858

[51] Int. Cl. ........... H01q 3/26

[58] Field of Search ........... 343/100 PE, 786, 343/853, 854, 858, 176

[56] References Cited

UNITED STATES PATENTS

| | | | |
|---|---|---|---|
| 2,619,635 | 11/1952 | Chait | 343/100 PE |
| 2,885,542 | 5/1959 | Sichak | 343/100 PE |
| 3,566,309 | 2/1971 | Ajioka | 343/786 |

*Primary Examiner*—Eli Lieberman

*Attorney*—Sughrue, Rothwell, Mion, Zinn & Macpeak

[57] ABSTRACT

Dual polarization transmission and reception is accomplished in an antenna feed system which divides first and second transmission signals into components which recombine in an antenna radiator to form cross polarized transmission signals. Frequency separating duplexers enable the simultaneous transmission and reception of pairs of dual polarized transmit and receive signals. The radiator includes first and second linearly polarized probes positioned along the axes of the received cross polarized signals. Faraday rotation can be compensated for by varying the planes of polarization of the transmit signals with respect to the planes of polarization of the receive signals. The latter variation is accomplished by varying the power division of the first and second transmission signals.

10 Claims, 9 Drawing Figures

INVENTOR
ERNEST J. WILKINSON
BY Sughrue, Rothwell, Mion, Zinn & Macpeak
ATTORNEYS

DUAL FREQUENCY DUAL POLARIZED ANTENNA FEED WITH ARBITRARY ALIGNMENT OF TRANSMIT AND RECEIVE POLARIZATION

BACKGROUND OF THE INVENTION

The invention relates to a communications system, preferably a satellite communications system, employing dual polarization for the transmit and receive signals.

Much of the effort spent on improving communications systems is directed towards increasing the amount of information, or number of channels, which can be transmitted and received. Due to the great demand for usage of frequencies for commercial and scientific purposes the apparent solution of simply increasing the bandwidth of the transmit and receive signals is unavailable. One method of doubling the amount of information which can be communicated on a given bandwidth is the use of dual polarization. For example, half of the information can be transmitted on a linearly polarized wave which is polarized in the horizontal direction, and the other half of the information can be transmitted on a linearly polarized wave which is polarized in the vertical direction. Since the two linearly polarized transmit waves are orthogonal they may be transmitted from the same antenna system with little or no interference. However, the difficulty, heretofore, with proposals for such systems has been in providing some means for isolating the received signals from the transmit signals.

In systems which transmit a single linearly polarized wave and receive a single linearly polarized wave which is orthogonal to the transmitted wave, interference between the transmit and receive signals can be prevented by using antenna feed systems which separate orthogonally related signals. However, if two orthogonally related transmit signals emanate from the same antenna which is to simultaneously receive two orthogonally related receive signals, it is impossible for all of the receive signals to be orthogonally related to all of the transmit signals. Consequently, the transmit and receive signals can not be separated merely by providing a feed system which isolates orthogonally related signals.

In addition to the isolation problem described above, it is also necessary that a system which transmits and receives linearly polarized waves be capable of rotating the orthogonally related planes of polarization of the transmit signals with respect to the orthogonally related planes of polarization of the receive signal in order to compensate for Faraday rotation. This is of particular importance in satellite communications systems. It is important that such relative rotation not impair the isolation between the transmit and receive ports of the antenna feed system.

SUMMARY OF THE INVENTION

In accordance with the present invention transmit/receive frequency isolation in a dual polarization system is accomplished by using duplexers which enable the simultaneous transmission and reception of two pairs of orthogonal signals. The problem caused by transmit energy reflection is overcome by the novel feature of eliminating the direct path for the transmitted energy and using the reflected transmitted energy (reflected by the duplexers) as the sole transmitted energy. Relative rotation between the planes of polarization of the transmit and receive signals, in order to allow compensation for Faraday rotation, is accomplished by applying the two transmit signals, which are to be orthogonally polarized, to a device which is referred to herein as variable orthagonal power divider. The variable orthogonal power divider has two inputs and two outputs. The two inputs are connected respectively to the two transmitter sources and the two outputs are connected respectively to the two duplexers which isolate the transmit and receive frequencies. The output signals from the variable orthogonal power divider pass through the duplexers to the orthogonally positioned probes of the antenna radiator. The variable orthogonal power divider divides each input signal in accordance with a ratio which can be controlled by a control element in the power divider. However, no matter what the position of the variable control element, the signals applied to the two inputs of the power divider will be divided in such ratios that when the components of said signals are recombined at the antenna radiator the recombined first and second transmit signals will be linearly polarized orthogonal to each other. By altering the controllable element in the orthogonal power divider the planes of polarization of the transmitted signals may be rotated. The orthogonal planes of polarization of the receive ports of the radiator is determined by the position of the probes in the antenna radiator.

DETAILED DESCRIPTION OF THE DRAWINGS

Figure 1:
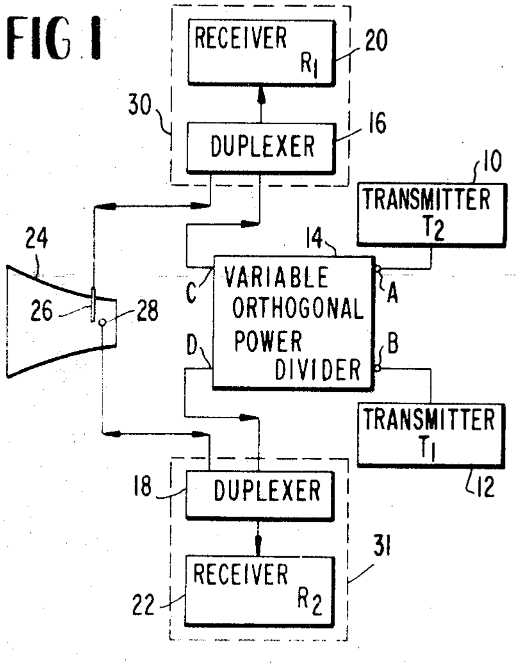
FIG. 1 illustrates a block diagram of a preferred embodiment of the invention.

The preferred embodiment described herein will be described in connection with a ground antenna station for communicating with a satellite antenna station. As shown in simplified block diagram form in FIG. 1, the ground station includes two sources 10 and 12 of transmitter signals, $T_2$ and $T_1$, which occupy substantially the same frequency band. A variable orthogonal power divider means 14, a pair of duplexers 16 and 18, a pair of receivers 20 and 22, and an antenna horn radiator 24, are interconnected as shown. In satellite communications systems presently in use the uplink bandwidth is centered at 6 GHz and the downlink bandwidth is centered at 4 GHz. These frequency bands are sufficiently separated to allow easy design of filters for use in duplexers 16 and 18 to pass one of the bands and reject the other band. Each of the duplexer/receiver combinations is enclosed in a paramp cooling system 30 or 31 of a type well known in the art. Since the purpose and design of paramp cooling systems are well known they will not be further discussed herein.

The signal $T_2$ from transmitter 10 is applied to input terminal A of the variable orthogonal power divider 14. The signal $T_2$ is divided into two components which appear at output terminals C and D of the power divider 14. As mentioned above, the relative amplitudes of the components appearing at C and D may be variably controlled by means to be described hereafter. The components at C are applied to the duplexer 16, and passed to a linearly polarized energy inducing and pickup means such as the vertical probe 26 of the antenna radiator 24. Although there may be some loss in power of the transmit component in the duplexer 16, for purposes of explanation it will be assumed that there is no loss. This assumption may be considered as accurate for the purposes of explaining the operation of this invention since substantially equal percentage losses occur at duplexer 16 and 18, and it is the relative amplitudes of the components which are important. The component of $T_2$ appearing at terminal D will pass through duplexer 18 to a linearly polarized energy inducing and pickup means such as horizontal probe 28 of the antenna radiator 24.

For purposes of discussion the probe 28 will be assumed to represent zero degrees or the reference axis on arbitrary coordinate axes, and it will further be assumed that the received radiation from the satellite is cross polarized in the planes which are coincident with the probes 28 and 26. However, it will be understood by anyone having ordinary skill in the art to which this invention pertains that the probes 28 and 26 are aligned with the received polarization by simply rotating the horn 24 until they are properly aligned. Coincidence of the receive polarization with the receive probes is desirable to minimize power losses and to maximize isolation, however, such coincidence is not absolutely necessary.

When the components of $T_2$ are applied to the probes 28 and 26, they will recombine resulting in a plane polarized transmit signal $T_2$ having a plane of polarization angle $\phi$ with respect to the horizontal axis. The value of the angle $\phi$ will depend, as is well known in vector analysis, upon the relative amplitudes of the components which are applied to the vertical and horizontal probes. Thus, if the components of $T_2$ appearing at terminals C and D are equal and both are positive (in phase as opposed to 180° out of phase), the signal $T_2$ will be plane polarized at an angle of 45° with respect to the horizontal.

The signal $T_1$ from the transmitter 12 is applied to the input terminal B of the variable orthogonal power divider 14. $T_1$ is also split up into two components which appear at terminals C and D, but the relationship between the amplitudes of the components of $T_1$ appearing at terminals C and D is not the same as the relationship of the amplitudes of the components of $T_2$. It may be stated that the relative amplitudes of the $T_1$ components at terminals C and D bear an orthogonal relationship to the relative components of the signal $T_2$ appearing at output terminals C and D. For example, taking the case described above wherein the components of signal $T_2$ appearing at terminals C and D are both equal and positive resulting in a polarization at an angle of 45°, the variable orthogonal power divider will operate upon a signal $T_1$ to cause the components at terminals C and D to also be of equal amplitude but the $T_1$ component at D will be negative (180° out of phase) with respect to $T_1$ component at C. The result, when these two components of $T_1$ are applied to the horizontal and vertical probes 28 and 26, is a recombined signal $T_1$ having a plane of polarization at an angle of 135° (90° + 45°) with respect to the horizontal axis. It will be noted that the transmitted signal $T_1$ is orthogonal to the transmitted signal $T_2$, and this is why the relationship between the relative amplitudes of the components for $T_1$ and $T_2$ is referred to as an orthogonal relationship.

In general, the power divider may be described as a means, having a pair of inputs and a pair of outputs, responsive to a first signal applied to the first input terminal for dividing said signal into components at the first and second output terminals and responsive to a second signal applied to the second input terminal for dividing the said second signal into components at the first and second output terminals, said components of said first signal having relative amplitudes to result in a first resultant vector orthogonally related to a second resultant vector which results from the relative amplitudes of the components of said second signal, if all components at said first output terminal were represented as vectors along a first arbitrary axis and all components at said second output terminal were represented as vectors along an axis orthogonal to said first arbitrary axis.

Apparatus which can maintain the above mentioned relationship will be described below in connection with FIGS. 2 and 4. However, it is noted here that the orthogonal power divider is variable in the sense that the angle of polarization of transmitted signals may be varied with respect to the angle of polarization of the receive probes 26 and 28. In the simplest case, assuming no Faraday rotation takes place between the ground station and the satellite, the transmit signal polarization will be aligned with the receive signal polarization. In this simple case power divider 14 is adjusted to divide the signal $T_2$ such that all of the power of $T_2$ appears at output terminal C and none at terminal D (Note that this is considered to be a division of $T_2$ into two components even though it is the extreme case). The reverse occurs for signal $T_1$. That is, all of the power of signal $T_1$ would appear at terminal D and none of the power at terminal C. From the latter, it will be apparent that $T_1$ will be transmitted with a plane of polarization in the horizontal direction since all of the power of $T_1$ is applied to probe 28. On the other hand, all of the power of $T_2$ will be applied to vertical probe 26, resulting in the transmit signal $T_2$ having a plane of polarization in the vertical direction. This represents the extreme case of power division, but even in this case it may still be said that the relative amplitudes of the components of $T_2$ bear an orthogonal relationship to the relative amplitudes of the components of $T_1$ as those components appear at the outputs of the variable orthogonal power divider 14.

Figure 2:
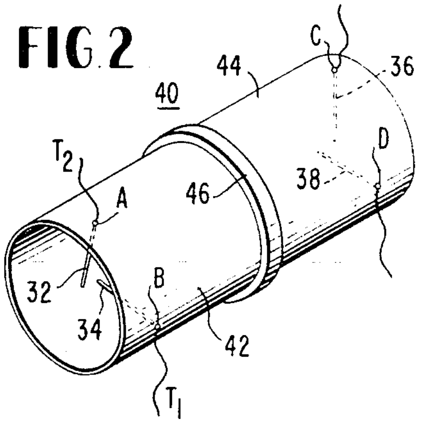
FIG. 2 is a plan view of one preferred embodiment of the variable orthogonal power divider.
Figure 2A:
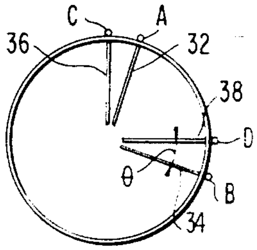
FIG. 2*a* is an end view of the device shown in FIG. 2.
Figure 1A:
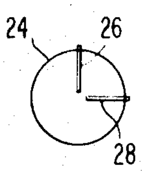
FIG. 1*a* illustrates the position of the radiator probes looking into the antenna radiator shown in FIG. 1.

One example of a variable orthogonal power divider 14 suitable for use in connection with the system shown in FIG. 1, is illustrated in FIG. 2, with an end view shown in FIG. 2a. The device 40 shown in FIG. 2 comprises a pair of power transmission means such as unity power couplers 42 and 44 of a type well known in the art, which are connected together by a rotary joint 46, also of a type well known in the art. The rotary joint 46 is attached to the unity couplers 42 and 44 in such a manner that unity coupler 42 may be rotated with respect to unity coupler 44. A pair of orthogonally positioned linearly polarized energy inducing means such as probes 32 and 34 are positioned in the unity coupler 42, whereas a pair of orthogonally positioned linearly polarized energy pick-up means such as probes 36 and 38 are positioned in the unity coupler 44. For the purpose of explanation it will be assumed that the probe 38 is aligned along the horizontal or zero axis and the probe 34 is at an angle of $-\phi$ with respect to the horizontal axis. This relationship is easily seen in connection with the FIG. 2*a*. It will also be appreciated that probe 32 will be at an angle $-\phi$ with respect to the probe 36 or $90° - \phi$ with respect to the horizontal. Furthermore, the angle $\phi$ may be varied by merely rotating the unity coupler 42 with respect to the unity coupler 44. The connections to probes 32 and 34 externally of the unity coupler 42 correspond to the A and B input terminals of the variable orthogonal power divider shown in FIG. 1. Similarly, the external connections of the probes 36 and 38 correspond to the output terminals C and D. Consequently, the transmit signal $T_1$ is applied to the probe 34 and the transmit signal $T_2$ is applied to the probe 32.

An explanation of how the planes of polarization of the transmit signals $T_1$ and $T_2$ remain orthogonal to each other and how they can be angularly varied with respect to the receive probes in the antenna radiator 24 will be described in connection with the vector diagrams shown in FIGS. 3*a* and 3*b*.

Figure 3A:
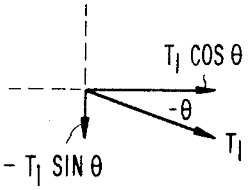
FIGS. 3*a* and 3*b* are vector diagrams helpful in illustrating the operation of the device shown in FIG. 2.

Referring first to FIG. 3*a*, the vector $T_1$ represents the amplitude and plane of polarization of the signal $T_1$ in the power divider 40 resulting from the application of the transmit signal $T_1$ to the probe 34. As is well known in the art, the polarity of the signal passing through the divider 40 will be in a plane aligned with the probe 34. The probes 36 and 38 will pick up components of $T_1$ which are aligned therewith. As illustrated in FIG. 3*a*, the component $T_1$ cosine $\phi$ will be picked up by probe 38 and a component $-T_1$ sine $\phi$ by probe 36. The relative amplitude components of $T_1$ appearing at terminals D and C will then pass through duplexers 18 and 16 respectively to the probes 28 and 26 respectively of the antenna radiator 24. In the specific example shown, probes 28 and 26 are aligned with probes 38 and 36. Consequently, the two components applied to the probes 28 and 26 will have the same relative amplitudes as the components $T_1$ cosine $\phi$ and $-T_1$ sine $\phi$ and they will combine vectorially resulting in the transmitted signal $T_1$ having a plane of polarization identical to that shown in FIG. 3*a* for the vector $T_1$.

Figure 3B:
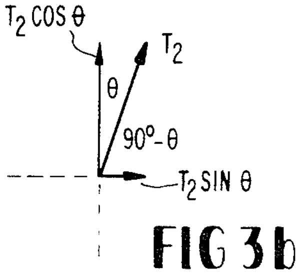

Referring to FIG. 3*b*, the vector $T_2$ represents the signal in the power divider 40 resulting from the application of the transmit signal $T_2$ to the probe 32. This signal will divide between probes 36 and 38 in accordance with the relative amplitudes $T_2$ cosine $\phi$ and $T_2$ sine $\phi$. These signals will be recombined when applied to the probes 26 and 28 in the antenna radiator 24 resulting in the transmitted signal $T_2$ having a plane of polarization identical to that shown in FIG. 3b for the vector $T_2$. It will be noted that the relative amplitudes of the $T_1$ components appearing at output terminals D and C are cosine $\phi$/−sine $\phi$, whereas the relative amplitudes of the $T_2$ components appearing at the terminals D and C are sine $\phi$/cosine $\phi$. It should also be noted that the components of $T_1$ and $T_2$ which appear at either of the output terminals, for example, terminal D, will not interfere with each other and will not prevent recombination at the probes 26 and 28 because the signals $T_1$ and $T_2$ are not coherent. The signals $T_1$ and $T_2$ which come from different generators would not be coherent if they are at slightly different frequencies. Even if they are at the same frequency, they would not be coherent if they are not completely in phase or 180° out of phase. On the other hand, the split components of a given signal, such as the $T_1$ components appearing at terminals C and D, are coherent signals and therefore, when the coherent components are applied to the probes 26 and 28 of the radiator 24 these signals will vectorially combine into a resultant signal having the desired plane of polarization.

The planes of polarization of the transmitted signals may easily be varied by simply rotating the unity coupler 42 with respect to the unity coupler 44. The vectors $T_1$ and $T_2$, as shown in FIG. 3a and 3b will also be rotated resulting in a rotation of the transmitted signal vectors from the radiator. Although the variable orthogonal power divider shown in FIG. 2 was described for the case where probes 38 and 36 are aligned with probes 28 and 26 it will be apparent to anyone of ordinary skill in the art that this alignment is unnecessary. If the latter mentioned probes are not aligned, the planes of poliarization of the signals emanating from the radiator will not be coincident with the $T_1$ and $T_2$ vectors illustrated in FIGS. 3*a* and 3*b*. However, the planes of polarization for the transmitted signals $T_1$ and $T_2$ emanating from the radiator will be orthogonal with respect to each other and can still be angularly rotated by rotation of the unity coupler 42 with respect to the unity coupler 44.

Figure 4:
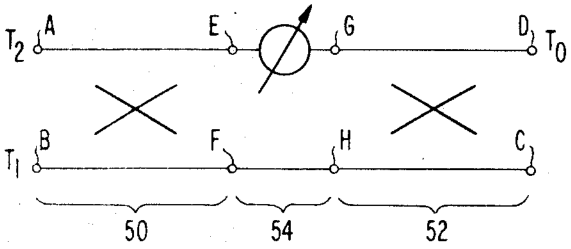
FIG. 4 illustrates an alternative embodiment of the variable orthogonal power divider.

An alternative device which may be used as the variable orthogonal power divider 14 of FIG. 1 is illustrated in FIG. 4 and comprises a pair of hybrids of 3 db couplers 50 and 52 connected together by a variable phase shift device 54. As is well known in the art, a 3 db coupler operates to split the power of a signal appearing at an input terminal into equal power components and apply the equal components to a pair of output terminals, respectively. The signal component at one output terminal will phase lag the signal component at the other output terminal by 90°. The operation of a variable phase shifter is also well known. It phase shifts the signal travelling between terminals E and G relative to the phase shift occurring between terminals F and H. The terminals of the device shown in FIG. 4 which correspond to the terminals A, B, C & D as illustrated in FIG. 1 are labelled by the respective numerals. The internal terminals of the 3 db coupler — phase shifter — db coupler device are labelled respectively EF, for the output terminals of 3 db coupler 50 and input terminals of the variable phase shifter, and G, H for the output terminals of the variable phase shifter and the input terminals of the 3 db coupler 52. The transmitted signals $T_2$ and $T_1$ are applied respectively to the terminals A and B, and the signals appearing at terminals D and C are applied respectively through duplexers 18 and 16 to the probes 28 and 26. The phase shifter 54 causes a phase shift between terminals E and G with respect to the phase shift that occurs as the signal travels between terminals F and H. However, since only the relative phase of the signals appearing at the output terminals is important, it will be assumed that a zero phase shift occurs between terminals F and H.

In order to provide an understanding of the manner in which the device shown in FIG. 4 performs the required power division to provide the orthogonal relationship necessary, the device will be described for two cases. The first case assumes the variable phase shifter 54 is set to provide a zero phase shift. Assuming the signal $T_1/\ 0°$ (signals will be represented by standard phasor notation to indicate relative amplitudes and phase angles) is applied at input terminal B, the component appearing at terminal E will be $0.707\ T_1/\ -90°$, and a component appearing at terminal F will be $0.707\ T_1/\ 0°$. It will be noted that an equal power division results in amplitude components equal to 0.707 times the original amplitude. This is because of the square root relationship between the voltage amplitude and the power. The signal appearing at terminal H will be the same as the signal appearing at terminal F and is represented by $0.707\ T_1/\ 0°$. Assuming a phase shift $\phi$ caused by the phase shifter 54, the $T_1$ component appearing at terminal G is represented as $0.707\ T_1/-90°$.

Each of the signals appearing at G and H will again be divided by the 3 db coupler 52. The resultant signal at terminal D may be represented as $0.5\ T_1/\ -90° + 0.5\ T_1/\phi - 90°$. The signal appearing at terminal C may be represented as $+0.5\ T_1/\ 0° + 0.5\ T_1/\phi - 180°$. Assuming initially that $\phi$ equals zero degrees, the $T_1$ component appearing at terminal D will be represented by $T_1/\ -90°$, and the component appearing at terminal C will be zero. Thus, if $\phi$ equals zero degrees all of the power applied to terminal B will appear at output terminal D. Consequently, only probe 28 in the radiator 24 will receive a component of the signal $T_1$ and therefore the plane of polarization of the transmitted signal $T_1$ will be along the zero axis. The same analysis will illustrate that for $\phi$ equals zero degrees, all of the power applied at terminal A will appear at output terminal C resulting in the transmitted signal $T_2$ being plane polarized along the vertical axis.

Now, assuming that phase shifter is set to provide a variable phase shift of 180°, the planes of polarization of the transmitted signals $T_1$ and $T_2$ will be reversed. The signal $T_1$ will be plane polarized in the vertical direction and the signal $T_2$ will be plane polarized in the horizontal direction. It should be noted that although references are made to the horizontal and vertical direction, this is only because the probes 28 and 26 are indicated as being in the horizontal and vertical directions for the purpose of explanation. The only important criteria is that the probes 26 and 28 are polarized orthogonal to each other and that the radiator is oriented so that the probes are aligned with the received polarization.

Variation of the phase shift caused by the variable phase shifter 54 between 0° and 180° will cause rotation of the planes of polarization of the transmitted signals $T_1$ and $T_2$ to any desired angles. A mathematical analysis of the continuous power division from 0 to $\phi$ by a power divider of the type shown in FIG. 4 as the phase shift varies from 0° to 180° is given in Microwave Circuits by Altman, 1964, Van Norstrand & Co., pp. 329–330. It is clear that throughout the variation the planes of polarization of the two transmitted signals will always remain orthogonal to each other.

The general case of the variable power divider may be defined as one which (*a*) divides a first input signal into first and second components having relative amplitudes $K_1 \sin \phi$ and $K_1 \cos \phi$, (*b*) divides a second input signal into first and second components having relative amplitudes $K_2 \sin (\phi \pm 90°)$ and $K_2 \cos (\phi \pm 90°)$, and (*c*) may be controlled to vary $\phi$, where $K_1$ is dependent upon the input amplitude of the first signal and power losses in the divider and $K_2$ is dependent upon the input amplitude of the second signal and power losses in the divider.

As mentioned above, the purpose of having the orthogonal power divider variable is to allow adjustment for Faraday rotation that may occur in between the ground station and the satellite. Presently, various methods are known for measuring the amount of Faraday rotation. These methods may be used to determine the Faraday rotation between the ground station and the satellite, and the system disclosed herein may be corrected manually or automatically by telemetry controlled servo systems by rotating the unity coupler 42 (FIG. 2) the desired amount or by varying the phase shift (FIG. 4) the necessary amount. It will be noted that the change in the Faraday rotation is very slow and therefore the period between Faraday measurements may be quite large. For the frequencies of 4 to 6 GHz, the Faraday rotation angle may vary less than two degrees in 24 hours.

Figure 5:
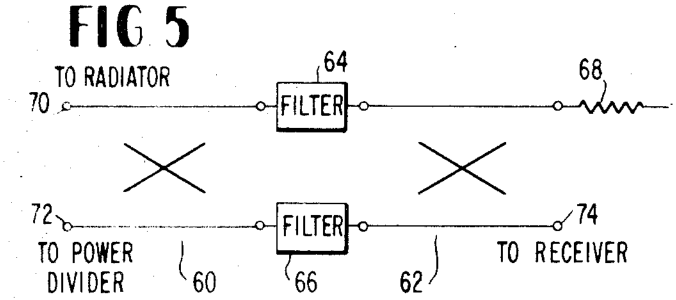
FIG. 5 illustrates a first embodiment of the duplexer as shown in FIG. 1.

One example of a duplexer which would be suitable for either duplexer 16 or 18 of FIG. 1 is illustrated in FIG. 5 and comprises a pair of 3 db couplers 60 and 62, a pair of bandpass or band reject filters 64 and 66, and a matched load 68. Duplexers of the type shown in FIG. 5 are well known in the art and therefore will be described only briefly herein. The duplexer has three terminals, 70, 72 and 74. The second output terminal of the 3 db coupler 62 is connected to a matched load 68 and is therefore not considered to be an output terminal of the duplexer. The terminal 70 of the duplexer is connected to the radiator, specifically either to the probe 26 or 28 depending upon whether it is duplexer 16 or duplexer 18. The terminal 72 is connected to one of the output terminals of the variable orthogonal power divider 14 and the terminal 74 is connected to the receiver. The filters 64 and 66 are designed to pass the 4 GHz centered band of the received signals and to reject the 6 GHz band of the transmitted signals. Thus, for the received signals the duplexer operates as a pair of cascaded 3 db couplers resulting in all of the received energy appearing at terminal 70 being applied to terminal 74 and thence to the receiver. On the other hand, for the transmit band of frequencies the filters 64, 66 act as reflectors resulting in substantially all of the power appearing at terminal 72 being coupled over to the terminal 70 and thereafter being applied to one of the probes 26, 28 as the reflected transmit signal.

Figure 6:
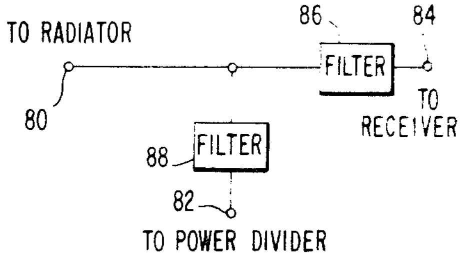
FIG. 6 illustrates an alternate embodiment of the duplexer shown in FIG. 1.

An alternate form of duplexer which would be suitable for the duplexers 16 and 18 of the system shown in FIG. 1 is illustrated in FIG. 6. The three terminals of a duplexer 80, 82 and 84 are connected respectively to the radiator probe, the variable power divider, and the receiver. The duplexer of FIG. 6 comprises a conventional T junction and a pair of filters 88 and 86. In the case of FIG. 6, the filter 86 is designed to pass the receive band of frequencies and reject the transmit band of frequencies whereas the filter 88 is designed to pass the transmit band of frequencies and reject the receive band of frequencies. It will be apparent that the transmit band of frequencies appearing at terminal 82 will pass through filter 88 and be applied to terminal 80 whereas the receive frequencies appearing at terminal

80 will pass through filter 86 and be applied to the receiver via terminal 84. Although the duplexers used in the disclosed system may be constructed of conventional wave guide apparatus, it is preferable to construct the duplexers out of either coax or stripline because the latter are smaller and therefore easier to cool. Since they are easier to cool, one may use a much smaller and less complex paramp cooling system.

What is claimed is:

1. An antenna feed system adapted to transmit a pair of cross polarized transmit signals and receive a pair of cross polarized receive signals, comprising, a. radiator means having first and second linearly polarized energy inducing and pickup devices which are orthogonally related, b. a variable orthogonal power divider means, having first and second input terminals and first and second output terminals, responsive to first and second transmit signals applied to said first and second input terminals respectively for dividing said first transmit signal into first and second components having relative amplitudes $K_1 \sin \phi$ and $K_1 \cos \phi$ appearing at said first and second output terminals respectively, and dividing said second transmit signal into first and second components having relative amplitudes $K_2 \sin (\phi \pm 90°)$ and $K_2 \cos (\phi \pm 90°)$ appearing at said first and second output terminals respectively, where $\phi$ is variable, $K_1$ is dependent upon the amplitude of said first transmit signal and power losses in said divider, and $K_2$ is dependent upon the amplitude of said second transmit signal and power losses in said divider, and c. a pair of transmit-receive duplexers, each having two terminals connected respectively to one of said output terminals and to one of said linearly polarized energy inducing and pickup devices and a third terminal adapted to be connected to a receiver circuitry.

2. An antenna feed system as claimed in claim 1, wherein said variable orthogonal power divider means comprises a first power transmission device, first linearly polarized energy inducing means connected to the first input terminal of said power divider for inducing a first plane polarized wave into said first power transmission device in response to said first signal applied to said first input terminal, second linearly polarized energy inducing means connected to the second input terminal of said power divider for inducing a second plane polarized wave orthogonal to said first plane polarized wave into said first power transmission device in response to said second signal applied to said second input terminal, a second power transmission device rotatably connected to and adapted to receive power from said first power transmission device, a first linearly polarized pickup means connected to the first output terminal of said power divider for picking up components of said plane polarized waves in said second power transmission means along the same axis as the axis of polarization of said first linearly polarized pickup means, and a second linearly polarized pickup means connected to the second output terminal of said power divider for picking up components of said plane polarized waves in said second power transmission means along the same axis as the axis of polarization of said second linearly polarized pickup means, the axes of polarization of said first and second pickup means being orthogonal.

3. An antenna feed system as claimed in claim 2, wherein a. said first and second power transmission means are first and second unity couplers, respectively, b. said first and second linearly polarized energy inducing means are first and second probes, respectively, positioned within said first unity coupler to induce cross polarized waves therein, and c. said first and second linearly polarized pickup means are first and second probes, respectively, positioned within said second unity coupler to pick up components of wave forms therein, said last mentioned probes being at right angles to each other.

4. An antenna feed system as claimed in claim 3, wherein each of said duplexers comprises, a. a first 3 db coupler having two input and two output terminals, one of said input terminals being connected to an output terminal of said power divider and the other input terminal being connected to one of said linearly polarized energy inducing and pickup means within said radiator, b. a second 3 db coupler having two input and two output terminals, one of said output terminals being connected to a matched load, the other output terminal adapted for connection to a receiver circuit, and c. a pair of filters for passing the receive band of frequencies and rejecting the transmit band of frequencies connected respectively between the output terminals of said first 3 db coupler and the input terminals of said second 3 db coupler.

5. The antenna feed system as claimed in claim 4, wherein said first and second linearly polarized energy inducing and pickup means in said radiator are orthogonally positioned probes within said radiator.

6. An antenna feed system as claimed in claim 1, wherein said variable orthogonal power divider means comprises, a. a first 3 db coupler having two input terminals, adapted for connection respectively to two sources of transmit signals, and two output terminals, b. a second 3 db coupler having two output terminals, which are the first and second output terminals respectively of said variable orthogonal power divider, and two input terminals, and c. means for connecting said two output terminals of said first 3 db coupler to the two input terminals of said second 3 db coupler, respectively, and for providing a variable phase shift between one of said output terminals of said first 3 db coupler and one of said input terminals of said second 3 db coupler.

7. An antenna feed system as claimed in claim 6, wherein each of said duplexers comprises, a. a first 3 db coupler having two input and two output terminals, one of said input terminals being connected to an output terminal of said power divider and the other input terminal being connected to one of said linearly polarized energy inducing and pickup means within said radiator, b. a second 3 db coupler having two input and two output terminals, one of said output terminals being connected to a matched load, the other output terminal adapted for connection to a receiver circuit, and c. a pair of filters for passing the receive band of frequencies and rejecting the transmit band of frequencies connected respectively between the output terminals of said first 3 db coupler and the input terminals of said second 3 db coupler.

8. The antenna feed system as claimed in claim 7, wherein said first and second linearly polarized energy inducing and pickup means in said radiator are orthogonally positioned probes within said radiator.

9. A method of simultaneously receiving and transmitting respective pairs of cross polarized signals from a radiator having first and second linearly polarized probes positioned orthogonal to each other, comprising the steps of, a. variably splitting a first transmission signal into first and second components having amplitudes which when plotted along any coordinate axes result in a resultant at angle $\phi$ with respect to one of said axes, $\phi$ being variable by varying the power split between said first and second components, b. variably splitting a second transmission signal into first and second components having amplitudes which when plotted along said coordinate axes result in a resultant at angle $\phi + 90°$ with respect to said one axis, c. frequency separating said first components from any simultaneously received signals and applying said first components to said first linearly polarized probe, and d. frequency separating said second components from any simultaneously received signals and applying said second components to said second linearly polarized probe, wherein said first and second components of said first transmit signal recombine in said radiator into a first linearly polarized transmission signal having a plane of polarization along a first axis dependent upon said variable power split, and said first and second components of said second transmit signal recombine in said radiator into a second linearly polarized transmission signal orthogonal to said first linearly polarized transmission signal.

10. An antenna feed system adapted to transmit a pair of cross polarized transmit signals and receive a pair of cross polarized receive signals, comprising, a. radiator means having first and second linearly polarized energy inducing and pickup devices which are orthogonally related, b. a variable orthogonal power divider, means having a pair of input terminals and a pair of output terminals, responsive to a first transmit signal applied to the first input terminal for splitting said signal into components at the first and second output terminals and responsive to a second transmit signal applied to the second input terminal for splitting said second signal into components at the first and second output terminals, said components of said first signal having relative amplitudes which may be resolved into a first resultant vector and said components of said second signal having relative amplitudes which may be resolved into a second resultant vector orthogonally related to said first resultant vector, if all components at said first output terminal were represented as vectors along a first arbitrary axis and all components at said second output terminal were represented as vectors along an axis orthogonal to said first arbitrary axis, and c. a pair of transmit-receive duplexers, each having two terminals connected respectively to one of said output terminals and to one of said linearly polarized energy inducing and pickup devices and a third terminal adapted to be connected to a receiver circuitry.

* * * * *